(12) United States Patent
Burd

(10) Patent No.: US 11,828,497 B2
(45) Date of Patent: Nov. 28, 2023

(54) CHILLED LIQUID RECIRCULATION DEVICE FOR GALLEY REFRIGERATION SYSTEMS

(71) Applicant: B/E Aerospace, Inc., Winston-Salem, NC (US)

(72) Inventor: Peter J. L. Burd, Burry Port (GB)

(73) Assignee: B/E Aerospace, Inc., Winston-Salem, NC (US)

( * ) Notice: Subject to any disclaimer, the term of this patent is extended or adjusted under 35 U.S.C. 154(b) by 151 days.

(21) Appl. No.: 16/814,182

(22) Filed: Mar. 10, 2020

(65) Prior Publication Data

US 2021/0285697 A1    Sep. 16, 2021

(51) Int. Cl.
*F25B 21/02*   (2006.01)
*B64D 11/04*   (2006.01)

(52) U.S. Cl.
CPC .............. *F25B 21/02* (2013.01); *B64D 11/04* (2013.01)

(58) Field of Classification Search
CPC ............ B64D 13/06; B64D 2013/0629; B64D 2013/0674; B64D 11/04; F25B 21/02; F25B 25/005; F25B 40/02; Y02B 30/52
See application file for complete search history.

(56) References Cited

U.S. PATENT DOCUMENTS

| | | | |
|---|---|---|---|
| 3,148,511 A * | 9/1964 | Gable | F25B 21/02 62/3.2 |
| 5,255,520 A | 10/1993 | O'Geary et al. | |
| 5,584,183 A | 12/1996 | Wright et al. | |
| 7,467,520 B2 | 12/2008 | Van Loon et al. | |
| 8,074,456 B2 | 12/2011 | Shah et al. | |
| 8,839,631 B2 | 9/2014 | Lu | |
| 9,267,714 B2 | 2/2016 | Hou et al. | |
| 9,914,526 B2 * | 3/2018 | Reiss | B64D 41/00 |
| 10,315,487 B2 | 6/2019 | Tsai et al. | |
| 10,377,493 B2 | 8/2019 | Burd | |
| 2004/0159118 A1 | 8/2004 | Hu | |

(Continued)

FOREIGN PATENT DOCUMENTS

DE    102013211177 A1    12/2014
EP       3012189 A1      4/2016

OTHER PUBLICATIONS

Extended Search Report for European Application No. 21155863.0 dated Jun. 1, 2021, 7 pages.

*Primary Examiner* — Gordon A Jones
(74) *Attorney, Agent, or Firm* — Suiter Swantz pc llo

(57) ABSTRACT

A chilled liquid recirculation device (CLRD) is disclosed. In embodiments, the CLRD has a first air-cooling stage wherein a liquid cooling medium (LCM) is pumped through a first-stage radiator and forced-air chilled by axial fans driving ambient air through the radiator fins. The initially chilled LCM passes to a second thermoelectric-cooling stage wherein a second-stage liquid-cooled heatsink receives the LCM, the liquid-cooled heatsink in contact with the cold side of a thermoelectric module having a hot side in contact with a finned heatsink through which second-stage fans force ambient air, cooling the hot side and thereby further chilling the cold side and the LCM by contact. The twice-chilled LCM is then pumped to a remote chiller device to chill the hot side of another thermoelectric module, thereby chilling a recirculating air supply passing through a finned heatsink in contact with the cold side.

7 Claims, 12 Drawing Sheets

(56) References Cited

U.S. PATENT DOCUMENTS

| | | | |
|---|---|---|---|
| 2005/0210910 A1* | 9/2005 | Rigney | B60H 1/32281 |
| | | | 62/407 |
| 2010/0071384 A1 | 3/2010 | Lu et al. | |
| 2014/0123683 A1 | 5/2014 | Hou et al. | |
| 2014/0260330 A1* | 9/2014 | Karlstedt | F25B 21/02 |
| | | | 62/3.3 |
| 2016/0231030 A1* | 8/2016 | Lu | F25D 17/067 |
| 2018/0281957 A1 | 10/2018 | Tsai et al. | |
| 2020/0108932 A1* | 4/2020 | Vandewall | B64D 11/04 |

* cited by examiner

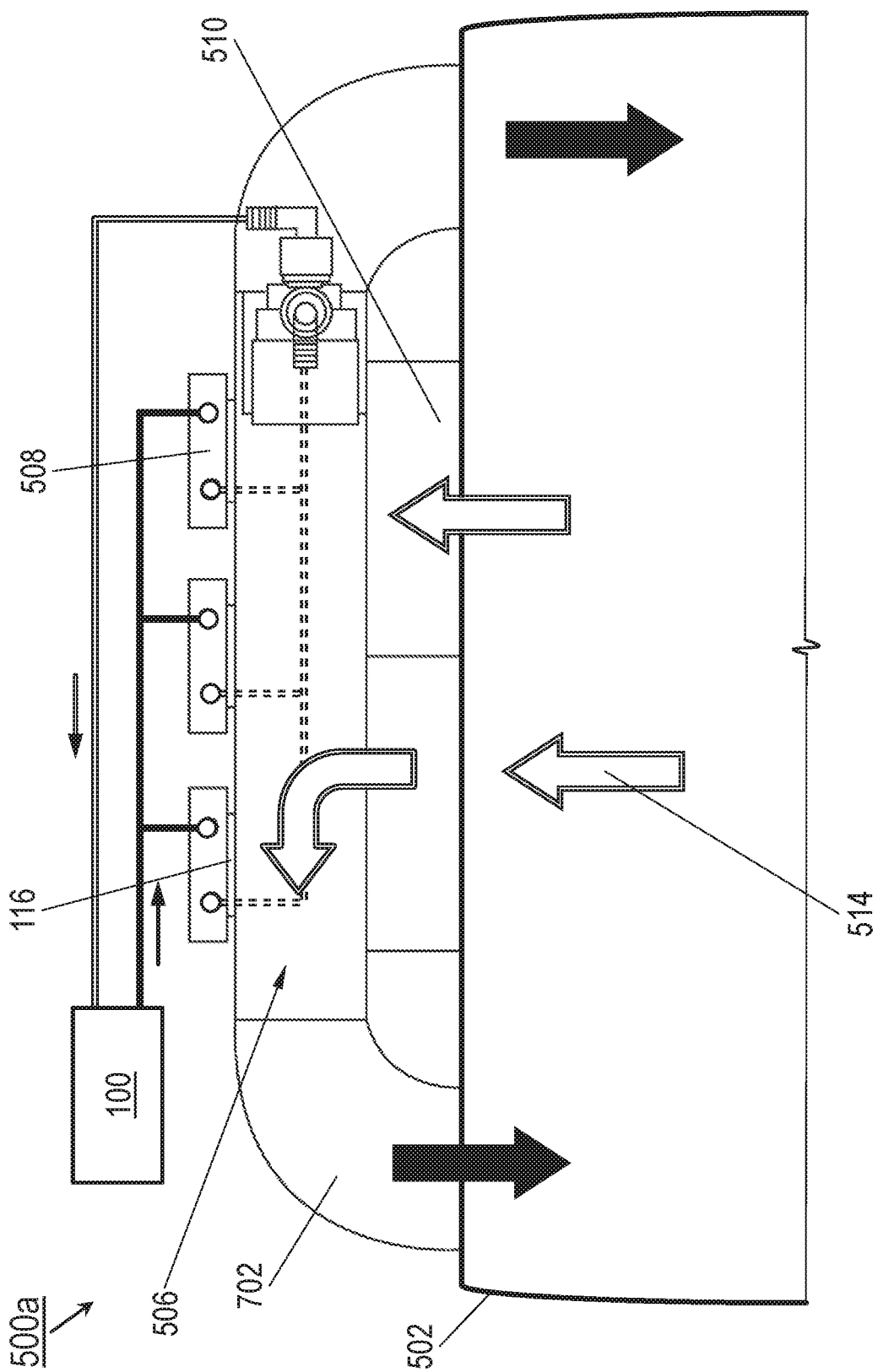

CHILLED LIQUID RECIRCULATION DEVICE FOR GALLEY REFRIGERATION SYSTEMS

BACKGROUND

Some commercial passenger aircraft (e.g., smaller, non-widebody craft) galley and bar units may require chilling capacity (e.g., refrigerated cart bays, chiller compartments, wine coolers, cold storage for Standard Units (SU) or meal boxes) but may not have access to conventional aircraft-based air chiller systems as is commonly found on larger craft, requiring alternative methods of recirculating chilled air. Similarly, some larger craft may include installed chiller systems, but these systems may not have sufficient chilling capacity to add additional compartments or cart bays if needed or desired.

SUMMARY

A compact chilled liquid recirculation device (CLRD) is disclosed. In embodiments, the CLRD includes an inlet for receiving a liquid cooling medium (LCM) from a tank or reservoir. The LCM is fed into a first-stage air-cooled heatsink device (e.g., air-cooled radiator) incorporating a set of fins thermally connected to the heatsink device, and axial fans for driving ambient air through the set of fins to initially chill the LCM. The initially chilled LCM is fed into a second-stage liquid-cooled heatsink thermally connected to the cold side of a thermoelectric heat exchanger. The hot side of the thermoelectric heat exchanger is thermally connected to another air-cooled/finned heatsink or radiator, wherein additional axial fans force ambient air through a set of fins to chill the hot side. The thermoelectric heat exchanger in turn transfers heat from the cold side to the chilled hot side, further chilling the cold side and the LCM in thermal contact therewith. The CLRD includes high-temperature pumps for feeding the twice-chilled LCM to a remote chiller device or for returning the LCM to the first stage for a subsequent chilling cycle.

A galley structure (e.g., monument) for a passenger cabin of an aircraft is also disclosed. In embodiments, the galley structure includes air intakes for receiving a proximate supply of ambient air and an intake duct for receiving a recirculating air supply. The galley structure includes pumps capable of pumping a liquid cooling medium (LCM) from a tank or reservoir into a two-stage chilled liquid recirculation device (CLRD). The CLRD includes a first-stage air-cooled heatsink device (e.g., air-cooled radiator) incorporating a set of fins thermally connected to the heatsink device, and axial fans for driving ambient air through the set of fins to initially chill the LCM. From the first stage, the initially chilled LCM is fed into a second stage of the CLRD, in particular a liquid-cooled heatsink thermally connected to the cold side of a thermoelectric heat exchanger. The hot side of the thermoelectric heat exchanger is thermally connected to another air-cooled/finned heatsink or radiator, wherein additional axial fans force ambient air through a set of fins to chill the hot side. The thermoelectric heat exchanger in turn transfers heat from the cold side to the chilled hot side, further chilling the cold side and the LCM in thermal contact therewith. The CLRD includes high-temperature pumps for feeding the twice-chilled LCM to a remote chiller device or for returning the LCM to the first stage for a subsequent chilling cycle. Within the remote chiller device is a remote heat exchanger in thermal contact with the recirculating air supply, and a third set of fans capable of chilling the recirculating air supply through contact with the twice chilled LCM, by driving the air supply through the remote heat exchanger.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 7 is a diagrammatic overhead view of the RLCC of FIG. 5 illustrating an alternative airflow configuration;

DETAILED DESCRIPTION

Figure 1:
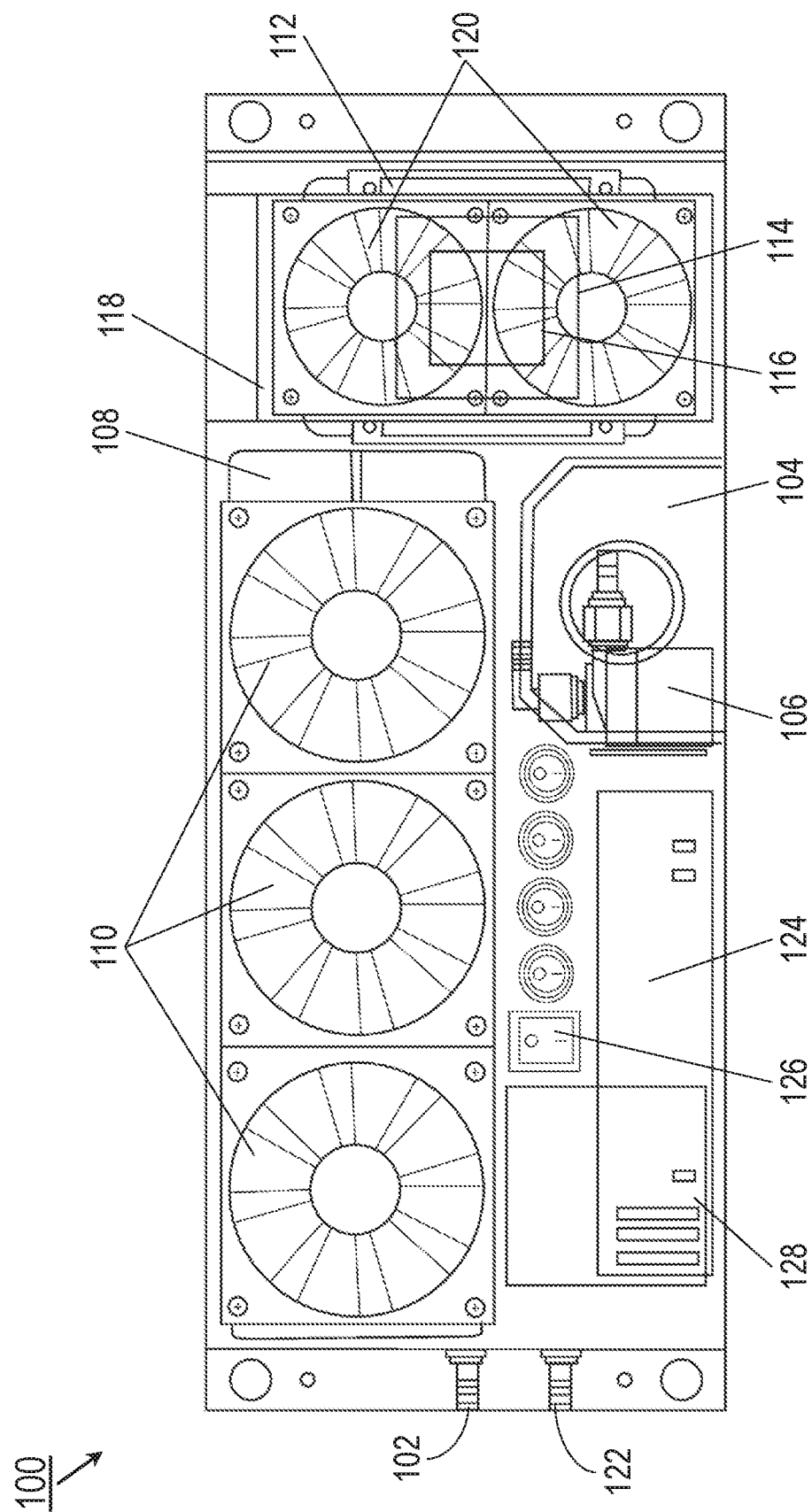
FIG. 1 is a partial cutaway plan view.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally to FIGS. 1 through 3B, a chilled liquid recirculation device 100 (CLRD) is disclosed. The CLRD 100 may include a return/inlet connection 102 for a liquid cooling medium (LCM), header tank 104 (with filter cap 104a) and high temperature supply pump 106 fed thereby, first-stage radiator 108, first-stage fans 110, second-stage liquid-cooled heatsink 112, high conductivity transfer plates 114, thermoelectric heat exchangers 116, finned heatsink 118, second-stage fans 120, external supply connection 122, inverter 124, external switches 126, and fuses 128.

In embodiments, the CLRD 100 provides a two-stage chilling process within a compact housing, progressively chilling the LCM (e.g., polyethylene glycol/polyglycol water (PGW) or other appropriate heat transfer liquid) to temperatures low enough to effectively preserve perishables or cold beverages and supplying the progressively chilled LCM to a remote chilling device in communication with a recirculating air supply. Broadly speaking, the two-stage chilling process involves a primary air cooling cycle and a secondary liquid cooling cycle incorporating Peltier heat pumps or like thermoelectric modules. For example, the LCM may be stored within the header tank 104 and pumped (via the pump 106) into the first-stage radiator 108.

In embodiments, the first-stage fans 110 (e.g., axial fans, scroll fans) extract ambient air into the housing (202, FIG. 2) of the CLRD 100 via first-stage air intakes (204, FIG. 2) and through the first-stage radiator 108 (e.g., first-stage air-cooled heatsink device). For example, the first-stage radiator 108 may be a high-capacity fin-and-tube radiator incorporating tubes through which the LCM is pumped and fins (302, FIG. 3A) conductively or thermally connected to the tubes such that the ambient air forced through the fins absorbs heat from the LCM flowing through the tubes. The ambient air may be passed through ducts (304, FIG. 3B) and out of the CLRD 100.

In embodiments, the LCM may flow through coolant lines from the first-stage radiator 108 into the second-stage liquid-cooled heatsink 112 after initial chilling by the first-stage radiator 108. For example, the second-stage liquid-cooled heatsink 112 may be disposed within the CLRD 100 in direct contact with the thermoelectric heat exchangers 116 (e.g., Peltier modules, thermoelectric modules), e.g., via high conductivity transfer plates 114. The thermoelectric heat exchangers 116 may comprise a "cold" side and a "hot" side, such that heat may be transferred between the two sides, creating a temperature differential, when a voltage is run through the thermoelectric device. For example, the "cold" side may be in conductive contact with the second-stage liquid-cooled heatsink 112 (e.g., via the transfer plates 114) while the "hot" side is in direct thermal or conductive contact with an air-cooled or finned heatsink device 118 (e.g., finned aluminum heatsink, radiator).

In embodiments, the finned heatsink device 118 is chilled by second-stage fans 120, which extract ambient air into the CLRD 100 (via second-stage air intakes (206, FIG. 2)) and force the air through the fins of the finned heatsink device, absorbing heat before venting from the CLRD. The force-cooling of the finned heatsink device 118 (and the resultant cooling of the hot side of the thermoelectric heat exchangers 116 in direct thermal contact with the finned heatsink device) may further chill the cold side of the thermoelectric heat exchangers (e.g., based on the voltage running through the thermoelectric module). Accordingly, the LCM flowing through the second-stage liquid-cooled heatsink 112 (and in direct thermal contact with the cold side of the thermoelectric heat exchangers 116) may be further chilled. In embodiments, the twice-chilled LCM may be fed via the external supply connection 122 to a remote chiller device remotely located from the CLRD 100.

Figure 2:
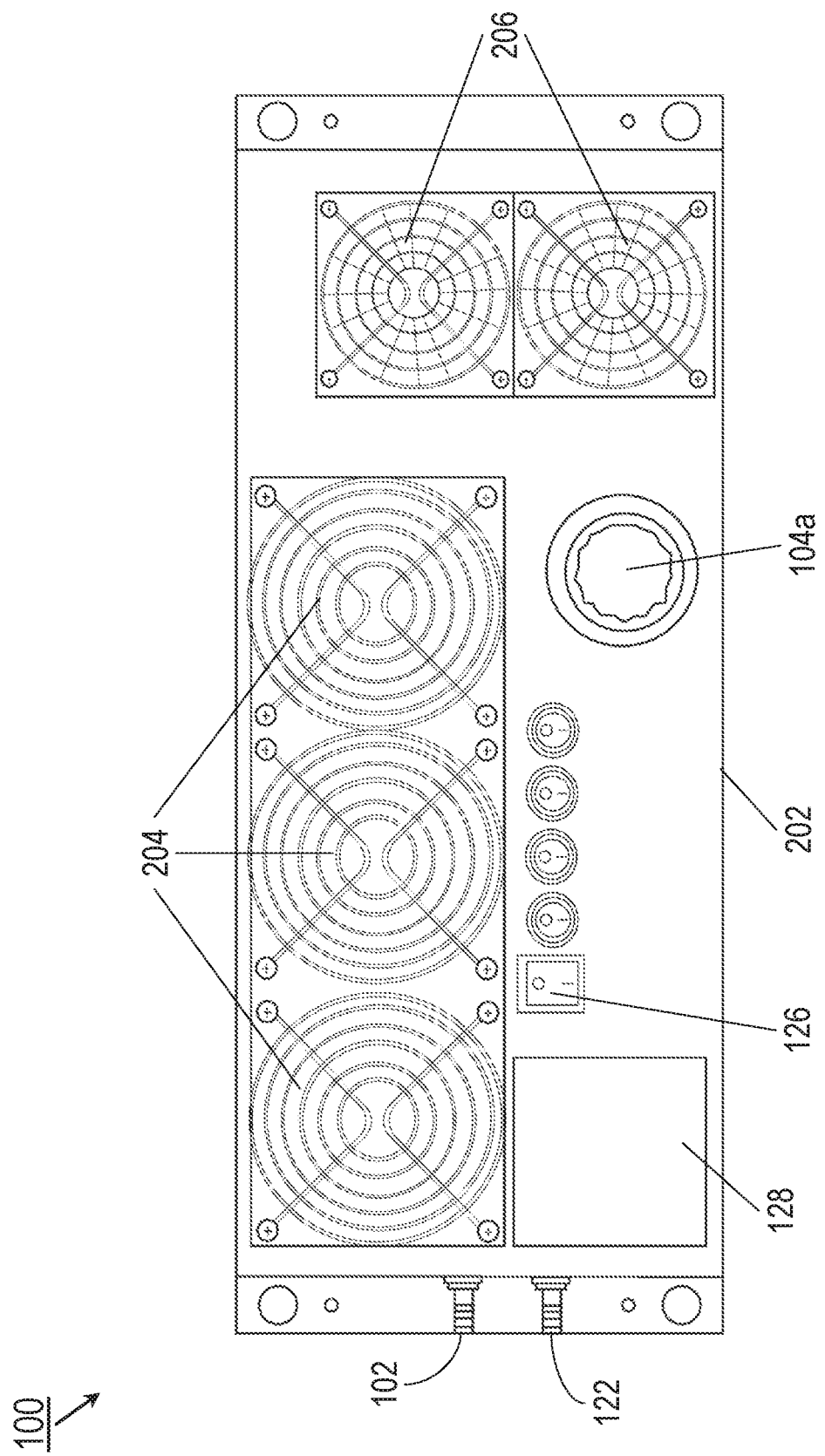
FIG. 2 is an external plan view, of a chilled liquid recirculation device (CLRD) according to example embodiments of this disclosure.
Figure 3A:
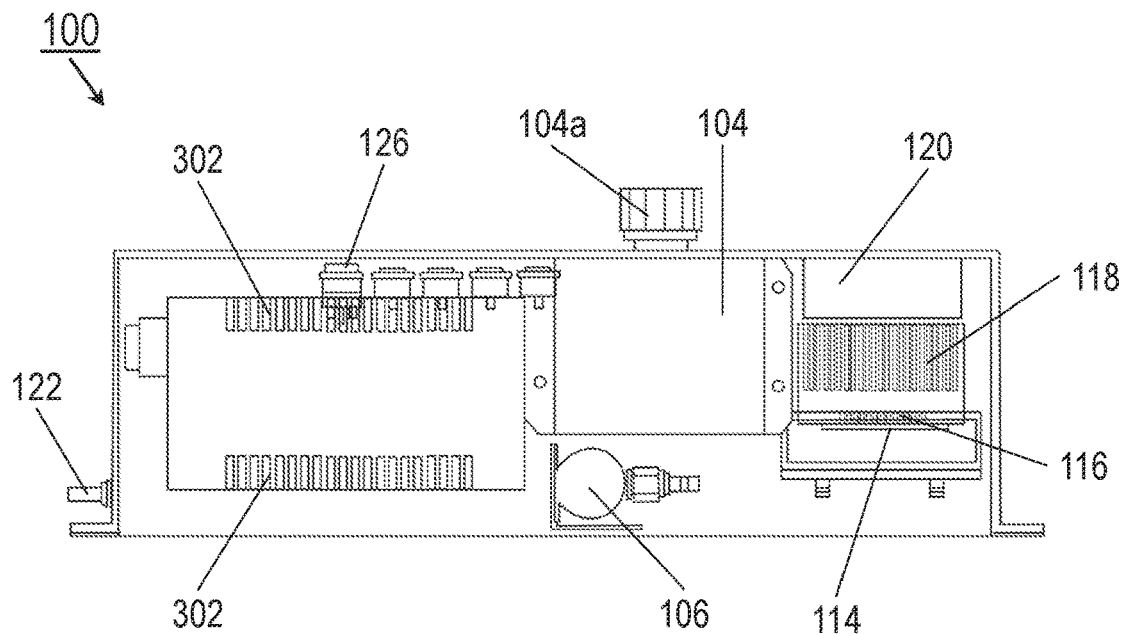
FIGS. 3A and 3B are respectively a partial cutaway long end view and a partial cutaway short end view of the CLRD of FIG. 1.
Figure 3B:
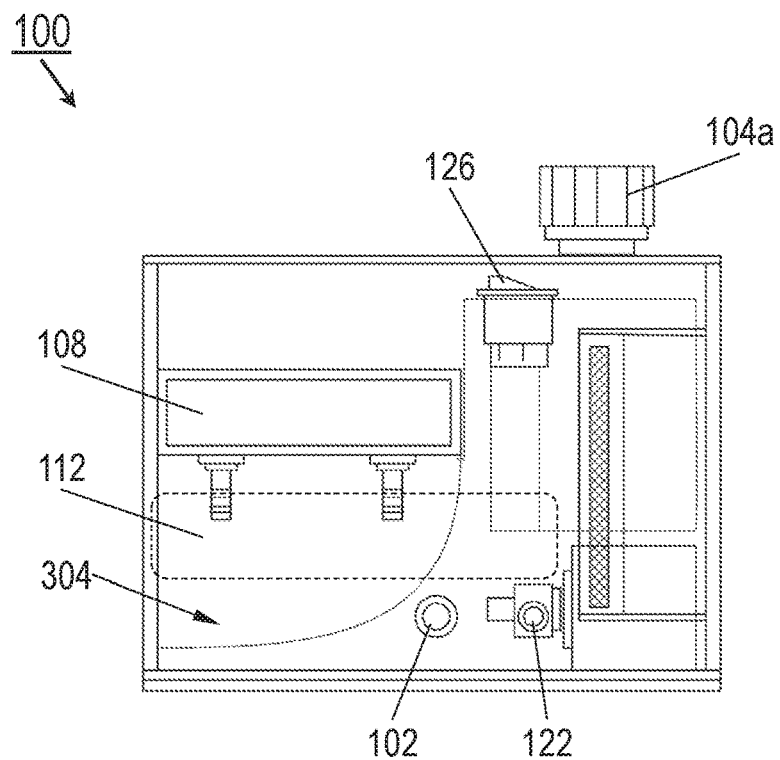

In embodiments, components of the CLRD 100 may be powered by a 24-volt or 48-volt current inverter 124 disposed within the housing (202, FIG. 2). For example, the inverter 124 may supply power to the first-stage and second-stage fans 110, 120; the high temperature supply pump 106; and thermoelectric heat exchangers 116. In some embodiments, the inverter 124 may additionally supply power to components of remote chiller devices fed by the twice-chilled LCM provided by the CLRD 100 via the external supply connection 122.

Figure 4A:
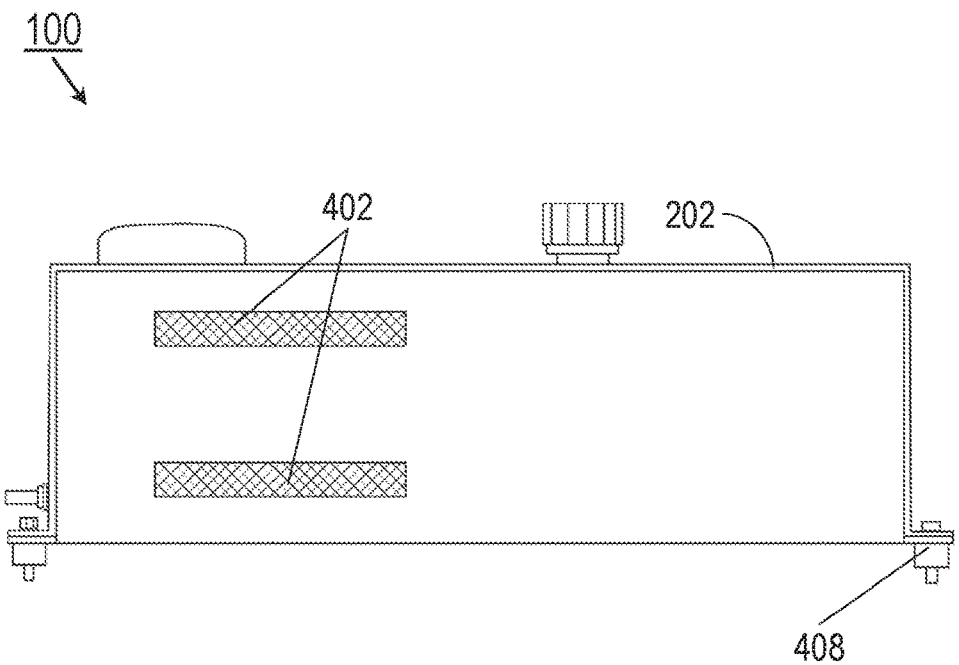
FIGS. 4A and 4B are external long end views of the CLRD of FIG. 1.
Figure 4B:
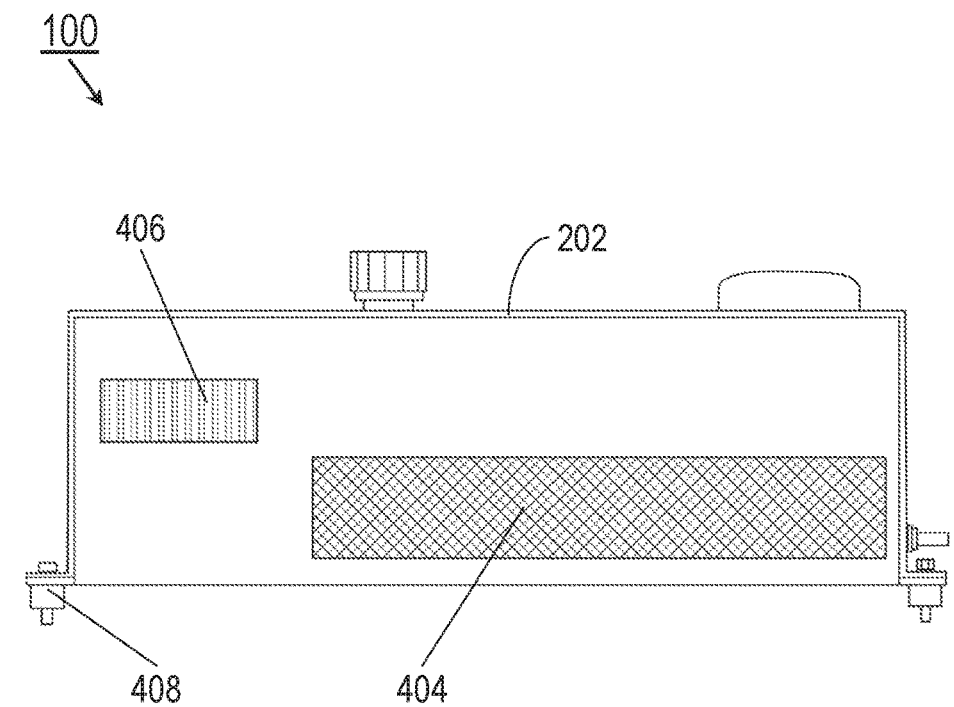

Referring to FIGS. 4A and 4B, the housing 202 of the CLRD 100 is shown. In embodiments, referring in particular to FIG. 4A, the housing 202 may include air intakes (402, FIG. 4A) for the inverter (124, FIG. 1). Referring in particular to FIG. 4B, in embodiments the housing 202 may include a primary exhaust vent 404, via which air forced through the first-stage radiator (108, FIG. 1) by the first-stage fans (110, FIG. 1) may be vented from the CLRD 100 after absorbing heat from the LCM (e.g., via the fins of the first-stage radiator). Similarly, the housing 202 may include a secondary exhaust vent 406, via which air forced through the finned heatsink device (118, FIG. 1) by the second-stage fans (120, FIG. 1) may be vented from the CLRD 100 after absorbing heat from the LCM (e.g., via the heatsink device and thermoelectric heat exchangers (116, FIG. 1) in thermal contact therewith). In some embodiments, the housing 202 may include bolt holes via which the CLRD 100 may be bolted (408) or otherwise fastened to a galley structure or other appropriate fixture within the aircraft cabin.

Figure 5:
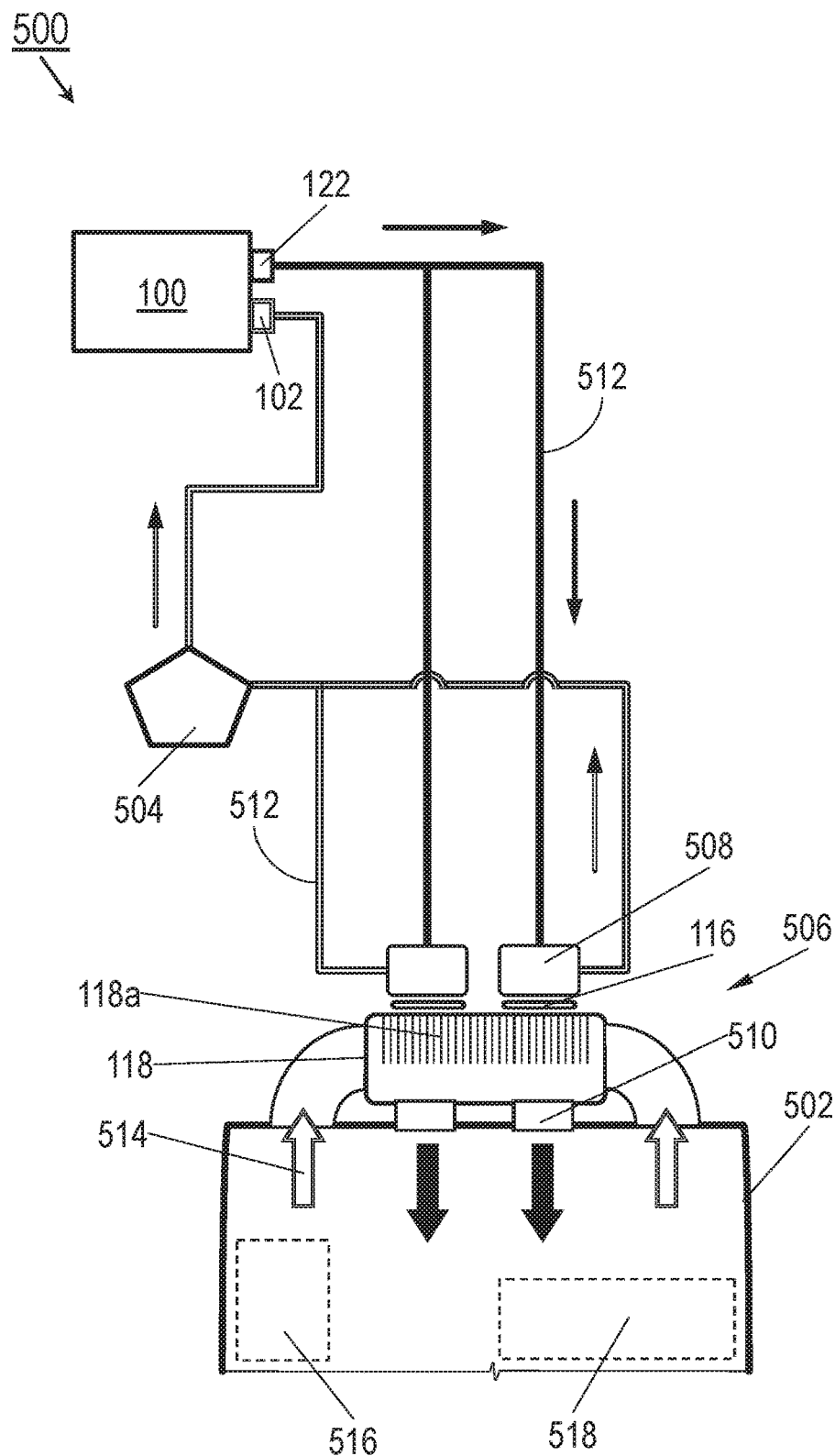
FIG. 5 is a diagrammatic illustration of the CLRD of FIG. 1 in communication with a remotely located compartment cooler (RLCC) according to example embodiments of this disclosure.

Referring now to FIG. 5, a galley chilling system 500 incorporating the CLRD 100 of FIGS. 1 through 4B is shown. The galley chilling system 500 may incorporate a galley monument 502 (e.g., galley structure), auxiliary supply pump 504, and a remotely located compartment cooler 506 (RLCC) including hot-side cooling tanks 508, thermoelectric heat exchangers 116, finned heatsink device 118, and remote fans 510 (e.g., axial fans, scroll fans).

In embodiments, the twice chilled (e.g., further chilled) LCM produced by the two-stage CLRD 100 may be pumped (e.g., via the CLRD supply pump (106, FIG. 1) and/or auxiliary supply pump 504) from the external supply connection 122 through flexible insulated hose 512 (e.g., or any appropriate lightweight insulated conduit) to the RLCC 506 (e.g., remote chiller device) remotely located from the CLRD 100. For example, the twice chilled LCM may be fed to cooling tanks 508 in direct thermal/conductive contact with the hot side of thermoelectric heat exchangers 116 (e.g., Peltier modules). The thermoelectric heat exchangers 116 may have cold sides similarly in direct contact with a finned heatsink device 118 (e.g., finned aluminum heatsink, similar to that found in the CLRD 100 shown by FIG. 1).

In embodiments, the twice-chilled LCM within the cooling tanks 508 may chill the hot sides of the thermoelectric heat exchangers 116, thereby imparting the low temperature of the LCM (e.g., according to the voltage through the thermoelectric heat exchangers) to the finned heatsink device 118. The remote fans 510 may extract a recirculating air supply 514 (e.g., from within the galley monument 502) and force the recirculating air supply through the finned heatsink device 118, where the air supply may be chilled by contact with the fins 118a of the finned heatsink device 118 and returned to the galley monument 502. In some embodiments, the chilled recirculating air supply 514 may be directed by the remote fans 510 toward particular sections of the galley monument 502, e.g., wine bottle chillers, chilled compartments, 516, and/or cart bays 518 capable of stowing galley carts (e.g., trolleys).

In embodiments, the LCM may be returned to the CLRD 100 after chilling the recirculating air supply 514 via the RLCC 506. For example, the auxiliary supply pumps 504 may return the LCM (e.g., via flexible insulated hose 512 or other appropriate conduit) to the inlet connection 102 of the CLRD 100, where the LCM may again undergo the two-stage chilling cycle described above for recirculation to the RLCC 506.

Referring generally to FIGS. 6A through 6E, the RLCC 506 is shown.

In embodiments, the components and orientation of the RLCC 506 may vary depending upon, e.g., the size of the compartments (e.g., the chiller compartments (516, FIG. 5) or cart bays (518, FIG. 5) to be chilled or the temperatures required within the said compartments (e.g., chiller compartments may be required by regulations to maintain their contents at or below a particular temperature). For example, the RLCC 506 may incorporate finned heatsinks 118 and remote fans 510 as well as thermoelectric heat exchangers 116 (e.g., Peltier modules) having a hot side in contact with the cooling tanks 508 wherein the twice-chilled LCM is fed and a cold side in contact with the finned heatsink devices. The thermoelectric heat exchangers 116 may be connected (602) to the inverter (124, FIG. 1) which supplies the necessary voltage through the thermoelectric module.

Figure 6A:
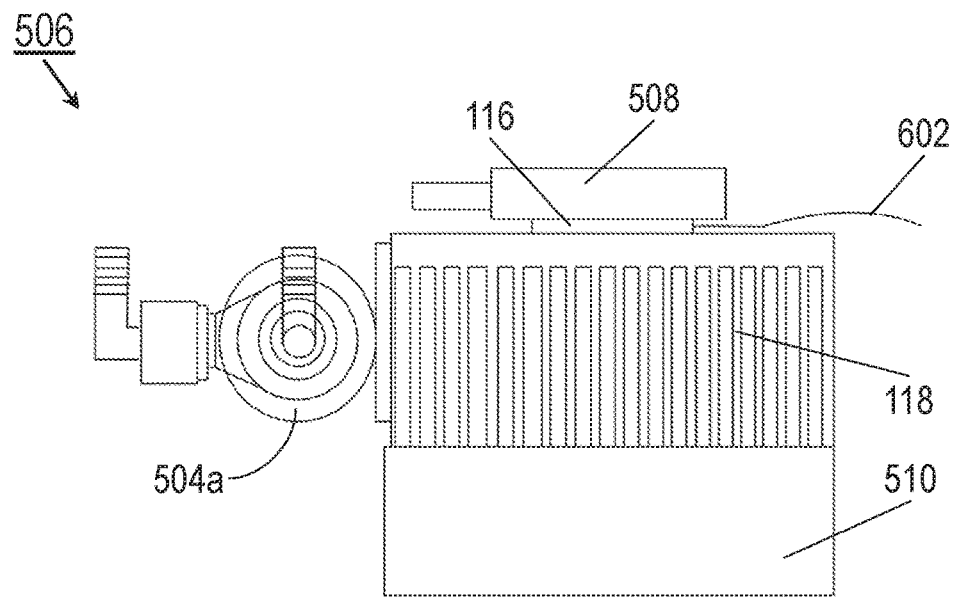
FIGS. 6A and 6B are end views of the RLCC of FIG. 5.
Figure 6B:
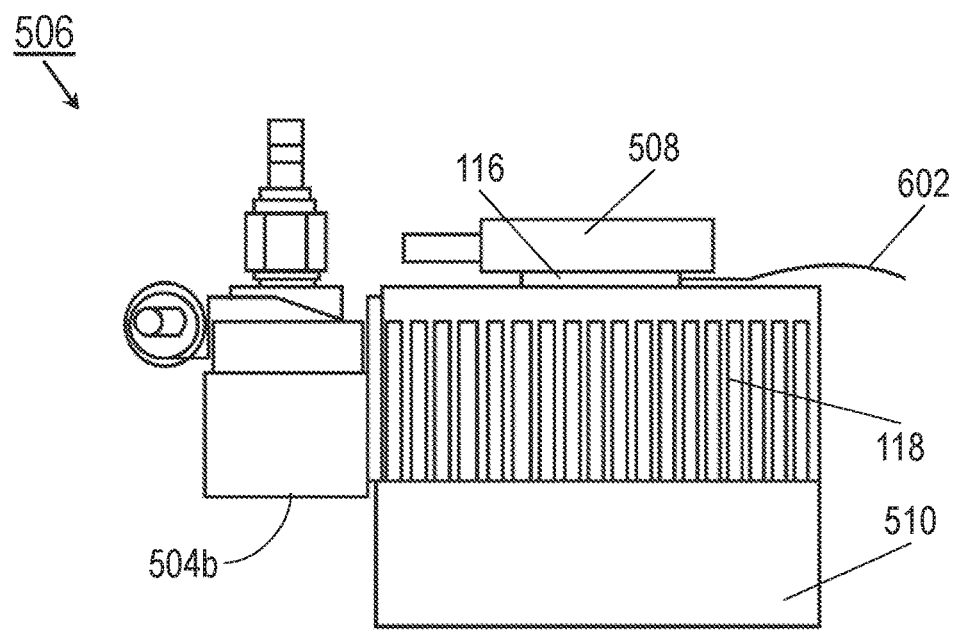
Figure 6C:
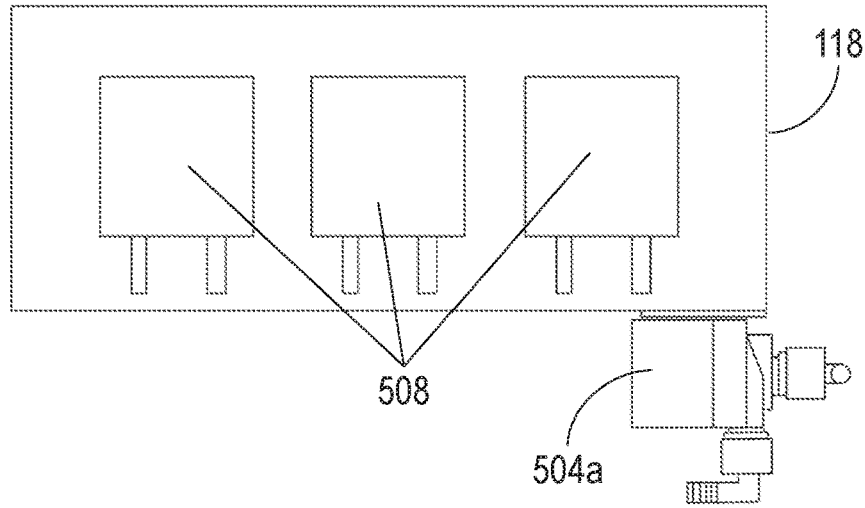
FIGS. 6C and 6D are plan views of the RLCC of FIG. 5.
Figure 6D:
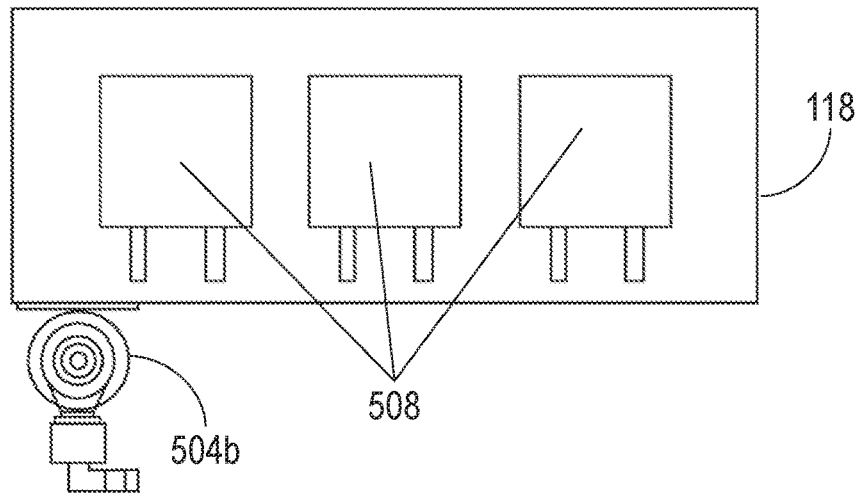
Figure 6E:
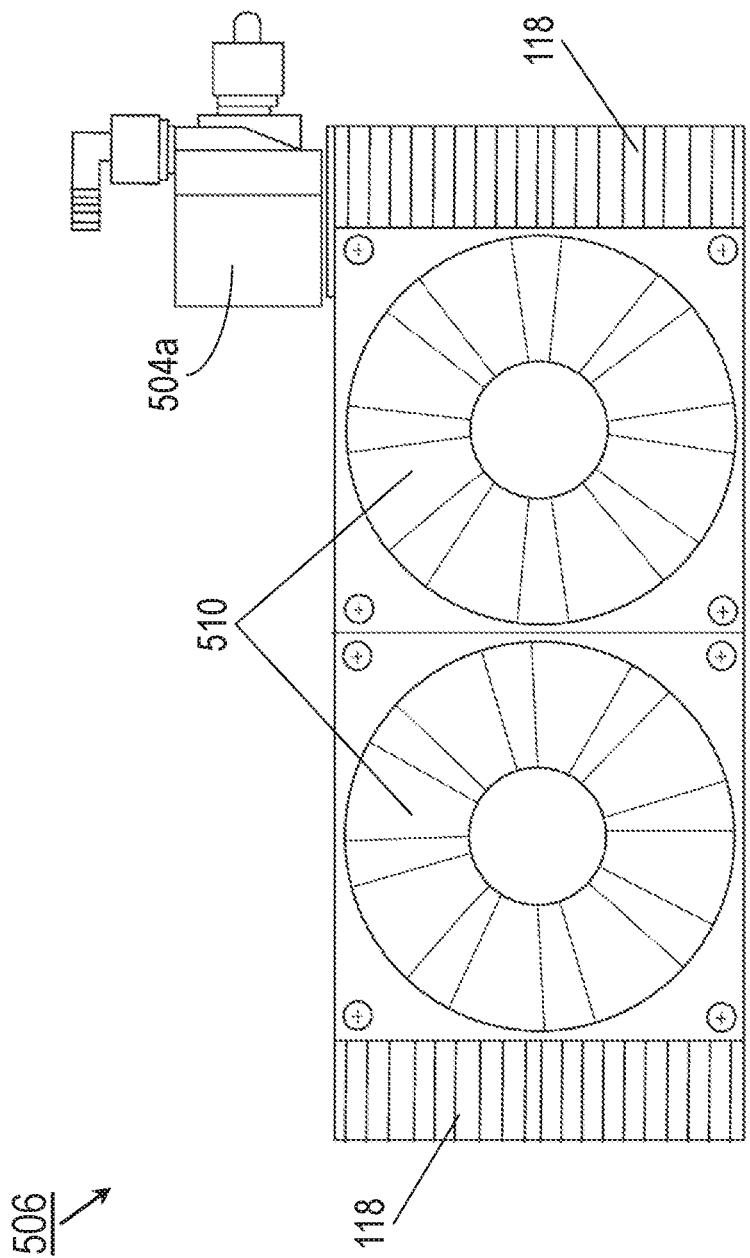
FIG. 6E is an underside view of the RLCC of FIG. 5.

In embodiments, the auxiliary supply pump (504, FIG. 5) (for returning the LCM to the CLRD (100, FIG. 5) after chilling the recirculating air supply (514, FIG. 5)) may be incorporated into the RLCC 506 in a transverse orientation (504a, FIGS. 6A, 6C, and 6E) or a vertical orientation (504b, FIGS. 6B and 6D). In some embodiments, additional thermoelectric cooling may not be required, and the RLCC 506 may be implemented and may function similarly to the first-stage radiator (110, FIG. 1). For example, the twice-chilled LCM may be fed through tubes in thermal communication with radiator fins, and the recirculating air supply 514 forced through the radiator fins by the remote fans 510 to provide a chilled recirculating air supply to the galley monument (502, FIG. 5) and its interior compartments.

Referring to FIG. 7, the galley chilling system 500a may be implemented and may function similarly to the galley chilling system 500 of FIG. 5, except that the remote fans 510 may force the recirculating air supply 514 into the RLCC 506 through a central intake (e.g., inverting the airflow direction shown by FIG. 5), such that the recirculating air supply, chilled by contact with the RLCC (e.g., via the twice-chilled LCM pumped from the CLRD 100 into the cooling tanks 508, and in thermal contact with the RLCC via the thermal heat exchangers 116) re-enters the galley monument 502 via side exhaust ducts 702.

Figure 8:
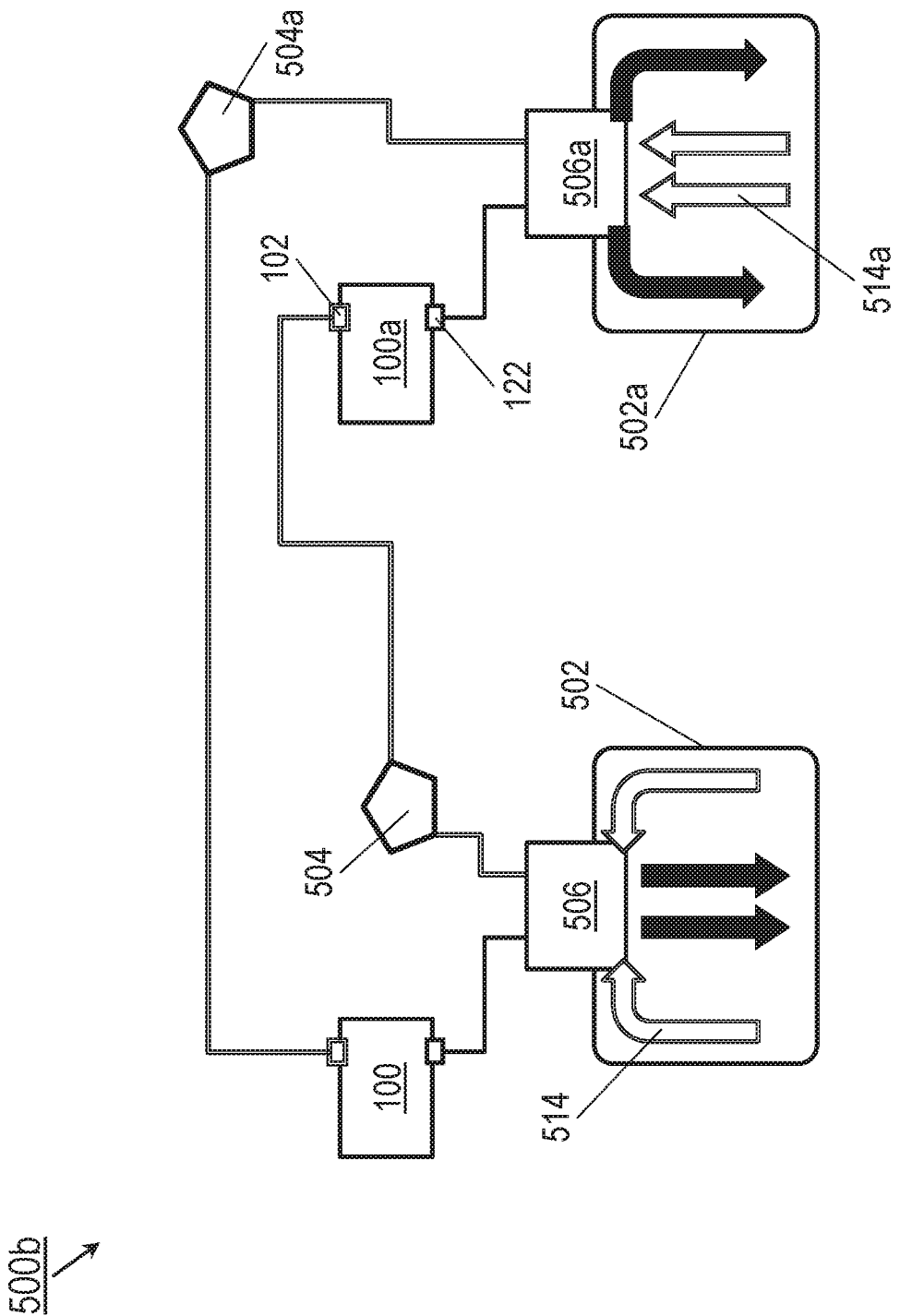
FIG. 8 is a diagrammatic illustration of a galley chilling system according to example embodiments of this disclosure.

Referring to FIG. 8, the multi-galley chilling system 500b may be implemented and may function similarly to the galley chilling systems 500, 500a of FIGS. 5 and 7, except that the LCM, after being twice chilled by the CLRD 100 and fed to the RLCC 506 for chilling the recirculating air supply 514 within the galley monument 502, may be fed (e.g., by the auxiliary supply pump 504 of the RLCC) to a second or subsequent CLRD 100a (rather than returned to the original CLRD 100).

In embodiments, the LCM (e.g., having absorbed heat via the RLCC 506), may enter the second CLRD 100a through the inlet connection 102 and undergo the two-stage chilling process. The twice-chilled LCM may then be fed (e.g., through the external supply connection 122 of the CLRD 100a) to a second RLCC 506a and thereby chill a recirculating air supply 514a within a second galley monument 502a. The LCM may, after contact with the second RLCC 506a, be returned to the original CLRD 100 or fed to still another CLRD (via the auxiliary supply pump 504a of the second RLCC 506a). In some embodiments, twice-chilled LCM may be fed to multiple RLCC 506, 506a from a single CLRD 100.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Figure 9A:
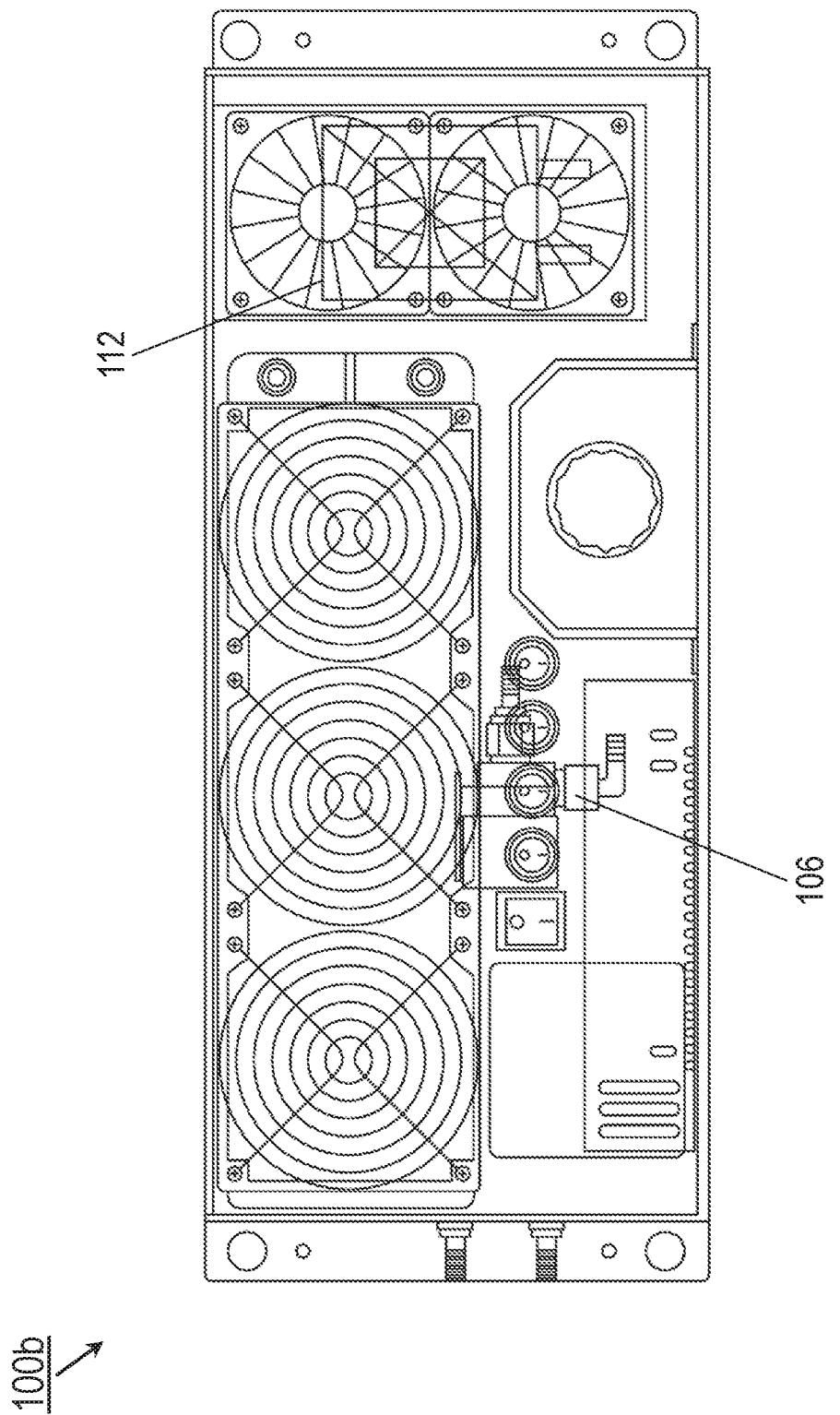
FIG. 9A is a partial cutaway plan view of the CLRD of FIG. 1 illustrating an alternative internal component layout.
Figure 9B:
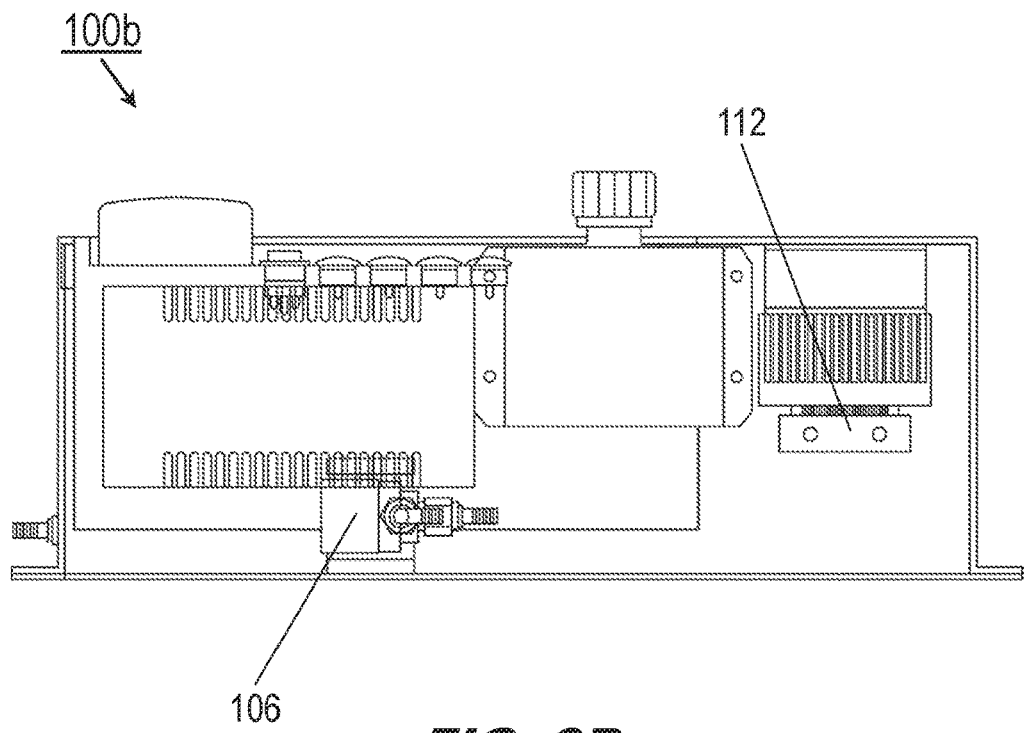
FIG. 9B is a partial cutaway long end view of the CLRD of FIG. 9A.
Figure 9C:
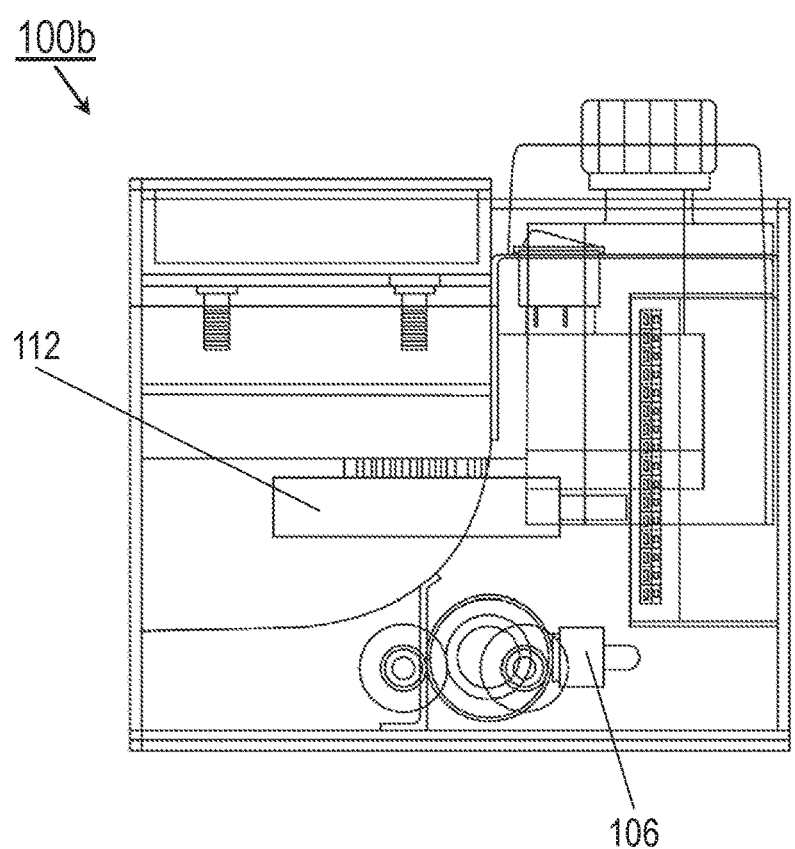
FIG. 9C is a partial cutaway short end view of the CLRD of FIG. 9A.

Referring to FIGS. 9A through 9C, the CLRD 100b may be implemented and may function similarly to the CLRD 100, 100a of FIGS. 1 through 8, except that the CLRD 100b may incorporate an alternative arrangement of one or more internal components, e.g., the high-temperature supply pump and the second-stage liquid-cooled heatsink device 112.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

I claim:

1. A galley structure for an aircraft cabin, comprising:
at least one air intake capable of receiving a supply of ambient air proximate to the galley structure;
at least one intake duct configured to receive a recirculating air supply;
at least one pump configured to provide a liquid cooling medium (LCM) from a reservoir;
at least one chilled liquid recirculation device (CLRD) comprising:
a first-stage chiller configured to initially directly chill the LCM, the first-stage chiller comprising:
a first air-cooled heatsink device configured to receive the LCM, the first air-cooled heatsink device having a plurality of first fins in thermal communication with the LCM; and
at least one first fan configured to 1) absorb heat from the LCM by driving the ambient air through the plurality of first fins and 2) expel the heated ambient air from the first-stage chiller;
a second-stage chiller configured to further directly chill the LCM after the first-stage chiller, the second-stage chiller comprising:
a second stage liquid-cooled heatsink in fluid communication with the first air-cooled heatsink device and configured to receive the LCM after the first air-cooled heatsink device;
at least one thermoelectric heat exchanger having a cold side configured to further indirectly chill the LCM and a hot side, the cold side in conductive contact with the second stage liquid-cooled heatsink such that the cold side conductively cools the second stage liquid-cooled heatsink and the hot side in thermal communication with a second air-cooled heatsink device having a plurality of second fins; and
at least one second fan configured to chill the hot side by driving the ambient air through the plurality of second fins; and
at least one remote chiller device fluidly coupled to the CLRD, the remote chiller device comprising:
at least one remote heat exchanger configured to receive the LCM, the remote heat exchanger in thermal communication with the recirculating air supply; and
at least one third fan configured to chill the recirculating air supply by driving the recirculating air supply through the remote heat exchanger.

2. The galley structure of claim 1, further comprising:
at least one of an interior compartment or a cart bay, the cart bay configured for stowage of at least one galley cart,
wherein
the at least one third fan is configured to direct the chilled recirculating air supply through at least one of the interior compartment and the cart bay.

3. The galley structure of claim 1, wherein the at least one pump is configured to return the LCM to the reservoir after contact with the remote heat exchanger.

4. The galley structure of claim 1, wherein the remote heat exchanger includes at least one third air-cooled heatsink device configured to receive the LCM, the third air-cooled heatsink device having a plurality of third fins in thermal communication with the LCM,
wherein
the at least one third fan is configured to drive the recirculating air supply through the plurality of third fins.

5. The galley structure of claim 1, wherein the at least one thermoelectric heat exchanger is a first thermoelectric heat exchanger having a first hot side and a first cold side, and the remote heat exchanger includes:
at least one cooling tank configured to receive the LCM; and
at least one second thermoelectric heat exchanger having a second hot side conductively coupled to the at least one cooling tank and a second cold side thermally coupled to at least one third air-cooled heatsink device;
wherein
the at least one third fan is configured to drive the recirculating air supply through the plurality of third fins of the third air-cooled heatsink device.

6. The galley structure of claim 1, wherein the galley structure is a first galley structure, the pump is a first pump, the CLRD is a first CLRD, and the remote chiller device is a first remote chiller device, further comprising:
at least one second galley structure remotely located from the first galley structure, the second galley structure comprising:
at least one second CLRD;
and
at least one second remote chiller device in fluid communication with the CLRD;
and
at least one second pump in fluid communication with one of the first remote chiller device and the second remote chiller device, the second pump configured to provide the LCM to the at least one second CLRD of the second galley structure.

7. The galley structure of claim 1, further comprising:
at least one third pump configured to return the LCM to the reservoir of the first galley structure after contact with the second remote chiller device.

* * * * *